United States Patent
Yoshioka et al.

(12) 
(10) Patent No.: US 6,698,949 B2
(45) Date of Patent: Mar. 2, 2004

(54) PRINTING APPARATUS FOR PRINT PROCESSING MULTIPLE SETS OF PAGED DATA AND PRINTING CONTROL PROGRAM

(75) Inventors: Yoshiki Yoshioka, Osaka (JP); Katsuji Furushige, Osaka (JP); Masaki Baba, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 0 days.

(21) Appl. No.: 10/040,493

(22) Filed: Jan. 9, 2002

(65) Prior Publication Data
US 2002/0141802 A1 Oct. 3, 2002

(30) Foreign Application Priority Data

Mar. 28, 2001 (JP) ........................................ 2001-091728

(51) Int. Cl.[7] .................................................. B41J 5/40
(52) U.S. Cl. .............................. 400/61; 400/70; 400/76
(58) Field of Search ............................... 400/61, 70, 76; 358/1.14

(56) References Cited

U.S. PATENT DOCUMENTS 6,545,766 B1 * 4/2003 Shima et al. .............. 358/1.14

* cited by examiner

Primary Examiner—Charles H. Nolan, Jr.
(74) Attorney, Agent, or Firm—Smith, Gambrell & Russell, LLP (57) ABSTRACT

According to the present printing apparatus, in case that print processing of a preceding job to a particular job has not ended yet when a control section is to start input processing of that particular job, the control section waits until the print processing of the preceding job ends and sets a print-inhibiting time for inhibiting parallel print processing to handle interruption processing in a period between an end of the print processing of the preceding job and a start of the input processing of that particular job. Then, the control section waits until the print-inhibiting time ends and starts the input processing of that particular job, and then starts print processing of that particular job.

8 Claims, 5 Drawing Sheets

PRINTING APPARATUS FOR PRINT PROCESSING MULTIPLE SETS OF PAGED DATA AND PRINTING CONTROL PROGRAM

This application is based on application No. 2001-091728 filed in Japan, the content of which is incorporated hereinto by reference.

BACKGROUND OF THE INVENTION

1. Field of the Invention

The present invention relates to a printing apparatus capable of performing print processing of more than one set of paged data, and to a printing control program.

2. Description of the Related Art

In general, a printing apparatus, such as a copying machine, a printer, and a facsimile machine, performs so-called paged management, by which print data is stored per page in a hard disk or a work memory, so that print data is printed out page by page.

Assume that a print unit (hereinafter, referred to as a job), such as a whole set of document data, is inputted into such a printing apparatus adopting the paged management via a communication line or the like. Then, if the job includes paged data of more than certain manageable pages (for example, 999 pages) determined by processing ability of an MPU or the like, the job is divided into a plurality of jobs, which are subjected to input processing and printed out successively.

In a case where the print processing of a job A preceding to a job B has not ended yet when the input processing of the job B is started, or a case where the input processing of the job B is started after the print processing of the preceding job A ended but during a print-inhibiting time period for inhibiting the print processing of a new job to accept a request of interruption printing from a user who directly manipulates the printing apparatus to make a copy or the like, the printing apparatus is controlled to start the print processing of the job B not immediately, but after the input processing of the job B ends (referred to as the prior art P).

Figure 7:
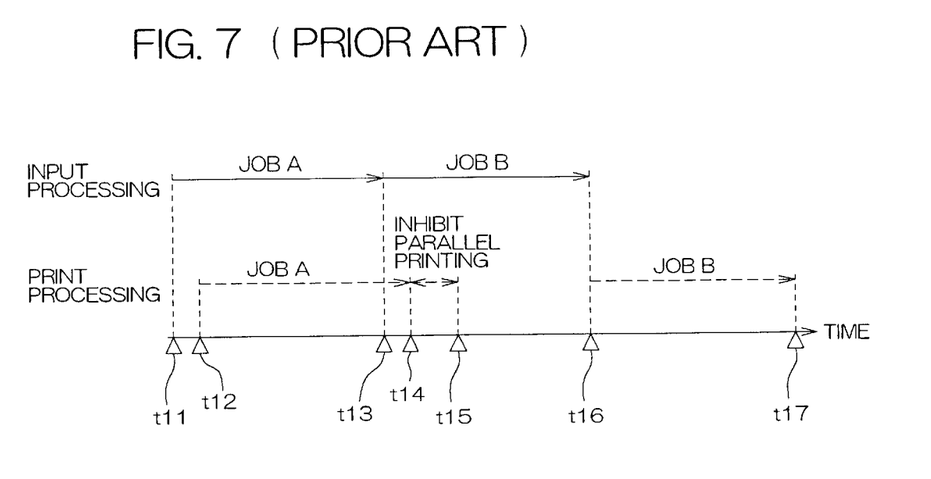
FIG. 7 is a time chart showing a content of a control of a copying machine according to a prior art P.

The following description will describe a copying machine as an example of a printing apparatus according to the prior art P. FIG. 7 is a time chart explaining an operation when two jobs A and B are inputted in succession. In the drawing, t11, t12, and the like denote instants on the time axis.

Initially, input processing of the job A is started by a central processing unit (CPU) of the copying machine (t11). This input processing continues until the input processing for the entire paged data of the job A ends (t13). As a result of this input processing, the paged data included in the job A is successively written into a certain work memory area.

Meanwhile, print processing of the job A is started when any of paged data is written into a certain limited work memory area by the input processing of the job A, (t12). This print processing continues until the entire paged data of the job A is printed out. The print processing of the job A ends (t14) a little later (for example, several seconds) since the input processing of the job A ended (t13). Hereinafter, an operation by which the input processing and the print processing of one job are performed successively in parallel like in a period between t11 and t14 is referred to as the parallel print processing.

In the parallel print processing, when the print processing ends, the paged data written into the work memory area by the input processing is successively overwritten with new paged data. Hence, only a limited capacity of, for example, several pages, is sufficient for the work memory area.

Further, at the instant the input processing of the entire paged data of the job A ends (t13), the input processing of the job B starts continuously (t13). This input processing continues until the input of the entire paged data of the job B ends (t16).

Meanwhile, when the print processing of the job A ends (t14), a print-inhibiting time period (t14 to t15) of approximately 30 seconds, for example, is set, so that the parallel print processing is inhibited to accept a request of interruption processing from a user who directly manipulates the copying machine to make a copy or the like. During the print-inhibiting time period, the print processing of the job B is not performed.

Herein, during a period from the input processing to the print-inhibiting time period (t14 to t15), the paged data of the job B is kept written into a rest of the area in the work memory area except for a certain area made free for the interruption processing. When the rest of the area is used up, the paged data that is not yet subjected to the print processing is also updated to new paged data successively. For this reason, at the instant the print-inhibiting time period ends (t15), the paged data on the top page of the job B is not stored in the work memory area, which makes it impossible to start the parallel print processing at the instant the print-inhibiting time period ends (t15).

Thus, the CPU waits until the input processing of the job B ends (t16), so that the paged data of the job B saved in a hard disk or the like by the input processing during a period from t13 to t16 is read out back into the work memory area, whereupon the print processing of the job B starts (t16).

Hereinafter, an operation by which the entire input processing of a particular job ends before the print processing of that particular job starts like in a period between t13 and t16 is referred to as the job reservation, and an operation by which the print processing is performed for the paged data of the job saved in the hard disk after the job reservation is referred to as the reserved job printing (t16 to t17).

As has been discussed, the conventional printing apparatus allows interruption processing, such as copying, between jobs, and therefore, has a merit that even in a case where a great number of jobs are inputted in succession, a user who wishes to make a copy or the like can interrupt the print processing without waiting long. Also, because the input processing of the job B is allowed during the print processing of the job A and the print-inhibiting time period, time can be utilized efficiently.

However, with the prior art P discussed above, if a job B of a great number of pages is inputted subsequent to a job A, the input processing of the job B takes long, and there arises a problem that it takes too long before the printing of the job B starts (t16) since the printing of the job A ended (t14).

In particular, in case that the job A and job B are divided jobs of originally one job, if a whole set of document data or the like is divided and printed out with a time interval in between in the middle of printing, there arises a problem that not only the printing takes too long before it ends, but also such a time interval makes the user wonder if the printing is suspended for any reason.

It is therefore an object of the present invention to provide a printing apparatus adopting page management for printing out print data, such as a copying machine, a printer, and a facsimile machine, which can perform print processing of the following job promptly when the print-inhibiting time period has passed.

Another object of the present invention is to provide a printing apparatus adopting paged management for printing out print data, such as a copying machine, a printer, and a facsimile machine, which can successively perform print processing of the jobs inputted in succession.

BRIEF SUMMARY OF THE INVENTION

A printing apparatus of the present invention effects a first control, according to which, in case that print processing of a preceding job to a particular job has not ended yet when a control section is to start input processing of that particular job, the control section waits until the print processing of the preceding job ends and sets a print-inhibiting time for inhibiting parallel print processing to handle interruption processing in a period between an end of the print processing of the preceding job and a start of the input processing of that particular job, then waits until the print-inhibiting time ends and starts the input processing of that particular job, and then starts print processing of that particular job without waiting until the input processing of that particular job ends.

According to this printing apparatus, it is possible to perform the print processing of the following job promptly by waiting until the print-inhibiting time passes and then starting the input processing of a particular job. In other words, it is possible to avoid an inconvenience occurring in the prior art such that the paged data in a print processing standby status is erased from the work memory area, and the paged data of the preceding job saved in a hard disk or the like has to be read out back into the work memory area.

A printing apparatus of the present invention can effect a second control, according to which, in case that print processing of a preceding job to a particular job has not ended yet when a control section is to start input processing of that particular job, the control section waits until the print processing of the preceding job ends and starts the input processing of that particular job, and then starts print processing of that particular job without waiting until the input processing of that particular job ends.

This printing apparatus does not set the print-inhibiting time. Hence, of all the jobs inputted in succession, the input processing and the print processing of the second and the following jobs are performed in parallel. Thus, in case that the second and the following jobs have a huge volume of data, it does not take long before the input processing ends, thereby making it possible to start the printing soon.

A printing apparatus of the present invention effects a third control, according to which, in case that print processing of a preceding job to a particular job has not ended yet when a control section is to start input processing of that particular job, the control section waits until input processing of the preceding job ends and starts the input processing of that particular job continuously, and then starts print processing of that particular job without waiting until the input processing of that particular job ends.

This printing apparatus does not set the print-inhibiting time, either. A difference in comparison with the second control is that, according to the second control, the control section waits until the print processing of the preceding job ends and starts the input processing of that particular job, whereas according to the third control, the control section waits until the input processing of the preceding job ends and starts the input processing of that particular job continuously. The above-specified difference allows the third control to start the print processing of the second and the following jobs sooner.

A printing apparatus of the present invention judges whether a particular job and a preceding job are divided jobs of a whole set of job data or undivided independent jobs by means of a control section, whereby the control section switches a control based on a judgment result as follows: upon judging as being undivided independent jobs, the control section effects the first control; and upon judging as being divided jobs of a whole set of job data, the control section may effect either the second or third control.

According to this arrangement, in case that a plurality of jobs to be processed are undivided independent jobs, the print-inhibiting time is set after the print processing of the preceding job ends until the input processing of that particular job starts, so that interruption processing other than these jobs, such as copying, is accepted. As a result of the interruption, irrelevant print materials are inserted among the print materials of these jobs, but it does not cause any trouble because each job is a print job for an undivided independent set of document data or the like from the start. On the contrary, by allowing the interruption processing, there can be offered an excellent advantage that any other user who wishes to make a copy or the like does not have to wait long even when a great number of jobs are inputted in succession.

In addition, if the jobs are divided jobs of originally a whole set of job data, by effecting the second or third control, it is possible to prevent inconveniences such that a whole set of document data or the like is divided and printed out with a time interval in between in the middle of printing, or such that irrelevant print materials are inserted in print materials that should be treated as a whole set as a result of the interruption.

A printing apparatus of the present invention may be arranged in such a manner that it can effect the first control and the second control, and which control should be effected is selected by a selector switch.

According to this printing apparatus, the user is allowed to select as he wishes whether a request of interruption processing, such as copying, from any other user should be accepted by setting the print-inhibiting time during printing intervals among a plurality of jobs, or printing should be performed in succession without setting the print-inhibiting time.

Also, a printing apparatus of the present invention may be arranged in such a manner that it can effect the first control and the third control, and which control should be effected is selected by a selector switch.

According to this printing apparatus, like the printing apparatus discussed above, the user is also allowed to select as he wishes whether a request of interruption processing, such as copying, from any other user should be accepted by setting the print-inhibiting time during printing intervals among a plurality of jobs, or printing should be performed in succession without setting the print-inhibiting time.

The present invention is applicable to a computer-readable control program of a printing apparatus for allowing the printing apparatus to effect each of the controls discussed above.

The following description will describe concrete arrangements of the present invention with reference to the accompanying drawings.

DETAILED DESCRIPTION OF THE INVENTION

The following embodiments and examples are described as example implementation of the present invention, and are not intended to limit the scope of the present invention.
(Arrangement of Printing Apparatus)

A printing apparatus includes a copying machine, a facsimile machine, a printer, etc., and the following description will describe, as an example, a copying machine furnished with a printing function of printing out print data inputted from a computer and a copying function of making a copy of an original document.

Figure 4:
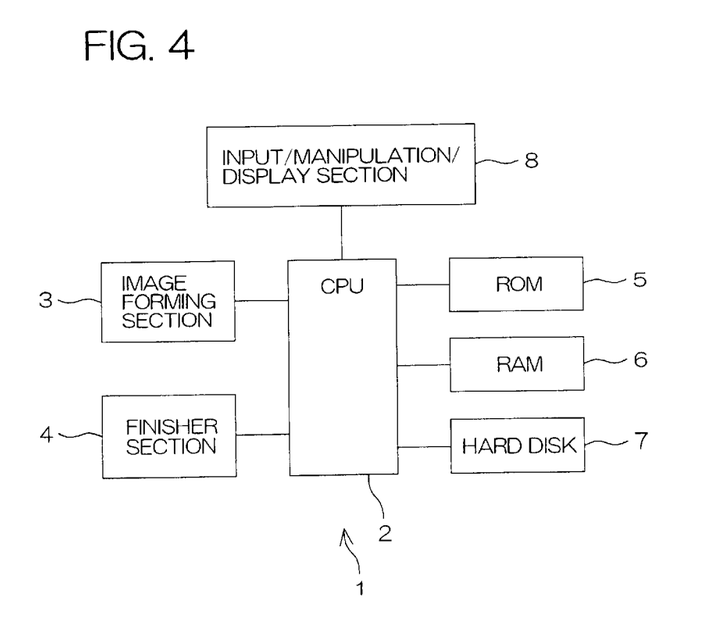
FIG. 4 is a block diagram depicting an arrangement of the copying machine according to one embodiment of the present invention.

FIG. 4 is a block diagram depicting an arrangement of a copying machine 1 according to one embodiment of the present invention.

As shown in FIG. 4, the copying machine 1 comprises a CPU 2 as a chief component for controlling an image forming section 3, a finisher section 4, etc. The image forming section 3 and finisher section 4 are provided with many actuators that operate according to a control program installed in a ROM 5. The CPU 2 is connected to the ROM 5, a RAM 6 (including a work memory area) for temporarily storing data, a hard disk 7 also for storing data, and an input/manipulation/display section 8 for performing input, manipulation, and display operations.

Besides the foregoing components, the copying machine 1 is provided with other mechanisms for performing various kinds of processing including copying and scanning of an original document, etc. However, the arrangements of such mechanisms are known in the art and the description thereof is omitted for ease of explanation.

Next, the following description will describe briefly an operation of the copying machine 1 when print data is inputted into the same from an external computer or the like.

When the print data is inputted into the copying machine 1, paged data per page included in a job defined as a unit of print data is successively written into both a certain work memory area within the RAM 6 and the hard disk 7 under the control of the CPU 2 (input processing). Then, the paged data written into the work memory area is successively printed out (print processing). In a case where the job includes paged data of more than certain manageable pages (for example, 999 pages), the job is divided into a plurality of jobs, and the input processing and the print processing are performed for each divided job. In addition, the copying machine 1 is allowed to perform the print processing after the input processing ends by reading out the paged data saved in the hard disk back into the work memory area.

(First Control)

Herein, a time period to inhibit the parallel print processing for handling interruption processing, such as copying, is set between the end of the print processing of a job C and the start of the input processing of a job D.

Figure 1:
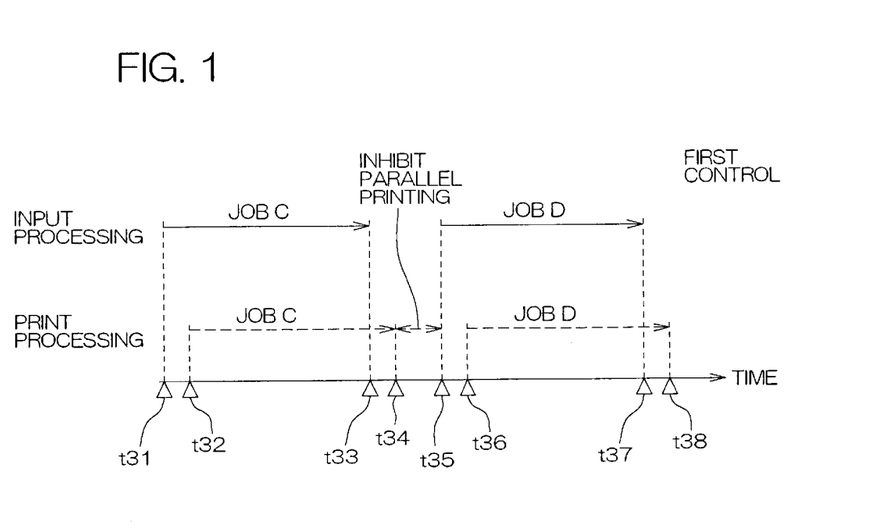
FIG. 1 is a time chart showing a content of a first control of a copying machine according to one embodiment of the present invention.

FIG. 1 is a time chart showing an example operation of the copying machine 1 for the input processing and the print processing in effecting a first control of the present invention, in which the print-inhibiting time period is set.

The following description will describe, with reference to the time chart of FIG. 1, an operation in a case where two jobs C and D are inputted in succession.

Initially, upon input of the job C, the input processing of the job C starts under the control of the CPU 2(t31), and the parallel print processing described with the prior art P is performed (t31 through t34).

Subsequently, the copying machine 1 is kept in a ready status from the end of the print processing of the job C (t34) to the start of the input processing of the job D (t35), so that the parallel print processing is inhibited for a certain time (t34 to t35) to handle interruption processing, such as copying.

The print-inhibiting time period is set for a certain time (for example, 30 seconds or one minute) regardless of whether interruption processing is requested or not. Also, when the interruption processing takes longer than the certain time, the certain time is extended until the interruption processing ends.

In comparison with the prior art P shown in FIG. 7, under the first control, the print processing of the job D starts (t36) without waiting until the input processing of the job D ends (t37), which makes the entire printing time (t31 through t38) shorter than in the prior art P where the reserved job print is performed after the job reservation. The first control is particularly effective when the job D includes a huge volume of data.

(Second Control)

Figure 2:
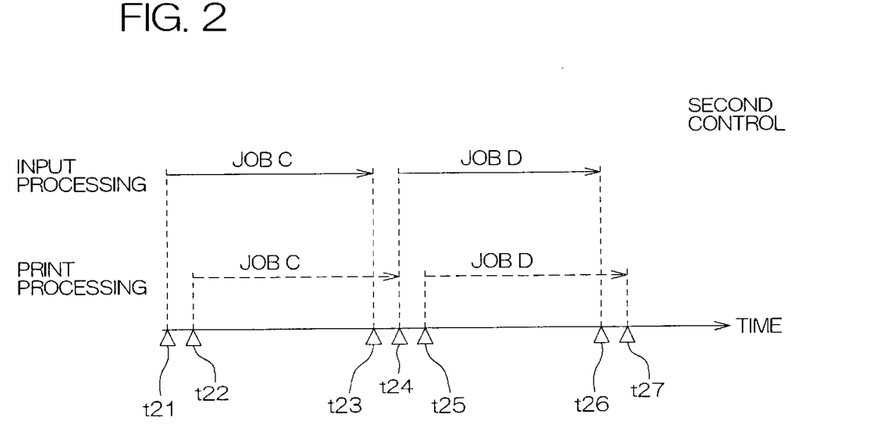
FIG. 2 is a time chart showing a content of a second control of the copying machine according to one embodiment of the present invention.

FIG. 2 is a time chart showing an example operation of the copying machine 1 for the input processing and the print processing in effecting a second control of the present invention.

The second control is favorable when the user prefers to print out a plurality of divided jobs in succession rather than to have the interruption processing be accepted.

The following description will describe, with reference to the time chart of FIG. 2, an operation in a case where two jobs C and D are inputted in succession.

Initially, upon input of the job C, the input processing of the job C starts under the control of the CPU 2 (t21), and the parallel print processing described with the prior art P is performed (t21 through t24).

Then, the CPU 2 waits until the print processing of the job C ends (t24) and starts input processing of the job D. Subsequently, the parallel print processing of the job D is performed (t24 through t27).

The copying machine effecting the second control does not accept any interruption processing, such as copying, and therefore, it never happens that the job C and the job D are printed out with a time interval in between in the middle of printing. Hence, the user never wonders if the printing is suspended for any reason. In addition, in case that the jobs C and D are the divided jobs of originally a whole set of print data, no irrelevant print material will be inserted between the jobs C and D.

(Third Control)

Figure 3:
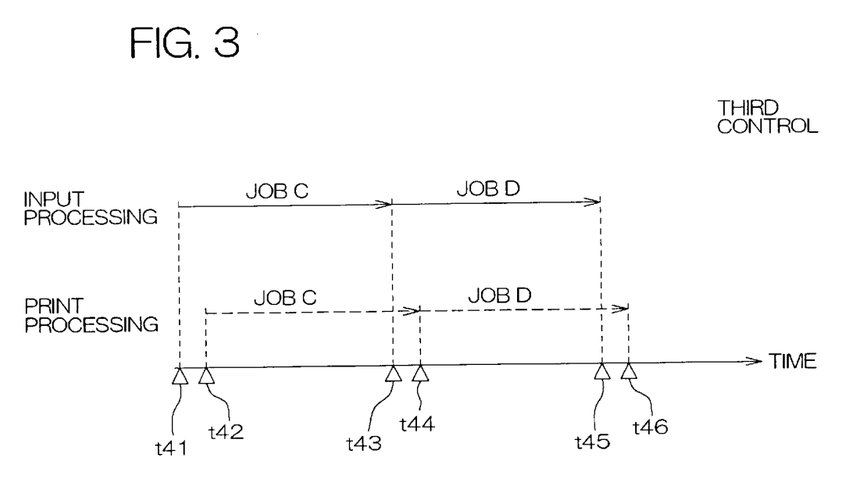
FIG. 3 is a time chart showing a content of a third control of the copying machine according to one embodiment of the present invention.

FIG. 3 is a time chart showing an example operation of the copying machine 1 for the input processing and the print processing in effecting a third control of the present invention.

The third control is also favorable when the user prefers to print out a plurality of divided jobs in succession rather than to give a higher priority to interruption processing.

The following description will describe, with reference to the time chart of FIG. 3, an operation in a case where two jobs C and D are inputted in succession.

Initially, upon input of the job C, the input processing of the job C starts under the control of the CPU 2 (t41), and the parallel print processing described with the prior art P is performed (t41 through t44).

Then, the CPU 2 waits until the input processing of the job C ends (t43) and starts the input processing of the job D. Subsequently, the parallel print processing of the job D is performed (t44 through t46).

The copying machine effecting the third control does not accept any interruption processing, such as copying, and therefore, it never happens that the job C and the job D are printed out with a time interval in between in the middle of printing. Hence, the user never wonders if the printing is suspended for any reason. In addition, in case that the jobs C and D are the divided jobs of originally a whole set of print data, no irrelevant print material will be inserted between the jobs C and D.

In comparison with the second control, under the third control, the CPU 2 waits not until the print processing of the job C ends (t44) but until the input processing of the job C ends (t43) and starts the input processing of the job D. Hence, it is possible to start the parallel print processing of the job D (t44 through t47) sooner.

When effecting the third control, if it takes too long before the parallel print processing of the job D starts (t44) since the input processing of the job D started (t43), the paged data written into the work memory area may be overwritten successively with new paged data before the print processing is completed. In order to avoid such an unwanted case, it is effective to adopt processing to provide the paged data written into the work memory area with a flag indicating a printing standby status, so that the overwriting of the paged data having the printing standby flag is inhibited.

When this processing is adopted, once the paged data is fully written into an area within the work memory where the printing standby status is not indicated since the input processing of the job D started (t43), the following paged data is not inputted successively unless the job is printed out and the printing standby status is cleared.

(Automatic Switching Between the First Control and the Second or Third Control)

It is possible to effect automatic switching control between the inhibition of the parallel print processing (FIG. 1; first control) and the execution of the parallel print processing (FIG. 2; second control or FIG. 3; third control) based on whether jobs inputted in succession are divided jobs of one job.

The following description will describe the switching processing between the first control and the second control. It should be appreciated, however, that the same applies to the switching between the first control and the third control.

Figure 5:
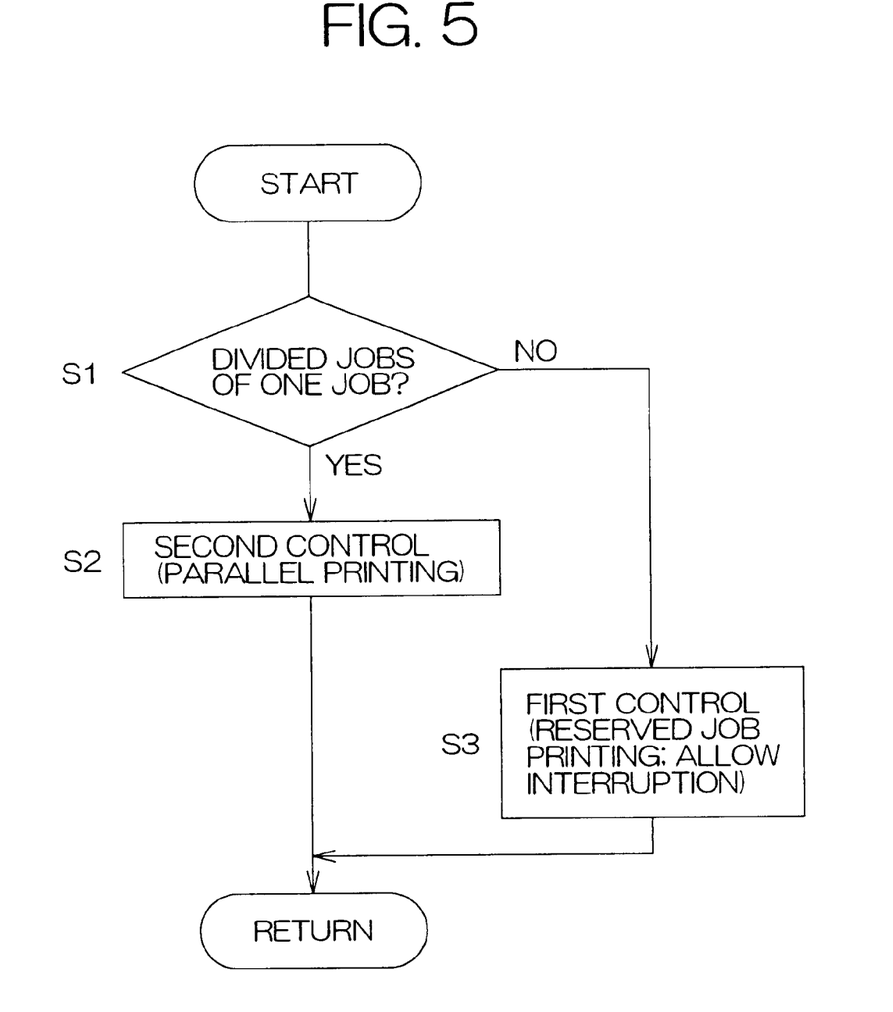
FIG. 5 is a flowchart detailing a procedure when changing a content of the control depending on a judgment whether a job and a preceding job are divided jobs of a whole set of job data or undivided independent jobs according to one embodiment of the present invention.

FIG. 5 is a flowchart detailing the automatic switching processing between the first control and the second control.

With the copying machine 1 effecting this switching processing, of all the jobs inputted in succession, whether the second and the following jobs are divided jobs of one job or not is judged by the CPU 2 (Step S1).

In case that the jobs are judged as being the divided jobs, the input processing and the print processing shown in a period between t23 and t27 of FIG. 2 are performed (Step S2; corresponding to the second control). Otherwise (when the jobs are judged as being undivided independent jobs), the input processing and the print processing shown in a period between t33 and t38 of FIG. 1 are performed (Step S3; corresponding to the first control).

Consequently, in a case where each of succeeding jobs is an independent set of print data, for example, those sent from different users, interruption processing, such as copying, becomes available while the parallel print processing is inhibited (corresponding to a period between t34 and t35 of FIG. 1). As a result, any other user does not have to wait long.

On the other hand, in a case where the jobs inputted in succession are divided jobs of one job, the parallel print processing is performed (corresponding to a period between t24 and t27 of FIG. 2) without accepting any interruption processing. Hence, it never happens that originally a whole set of print data is divided and printed out with a time interval in between.

(Manual Switching Between the First Control and the Second or Third Control)

It is also possible to pre-set the execution of a control to set a parallel printing inhibiting time period while the parallel print processing is performed (FIG. 1; first control) or the execution of the parallel print processing (FIG. 2; second control or FIG. 3; third control) by inputting settings into the input/manipulation/display section 8.

The following description will describe the switching processing between the first control and the second control. It should be appreciated, however, that the same applies to the switching between the first control and the third control.

Figure 6:
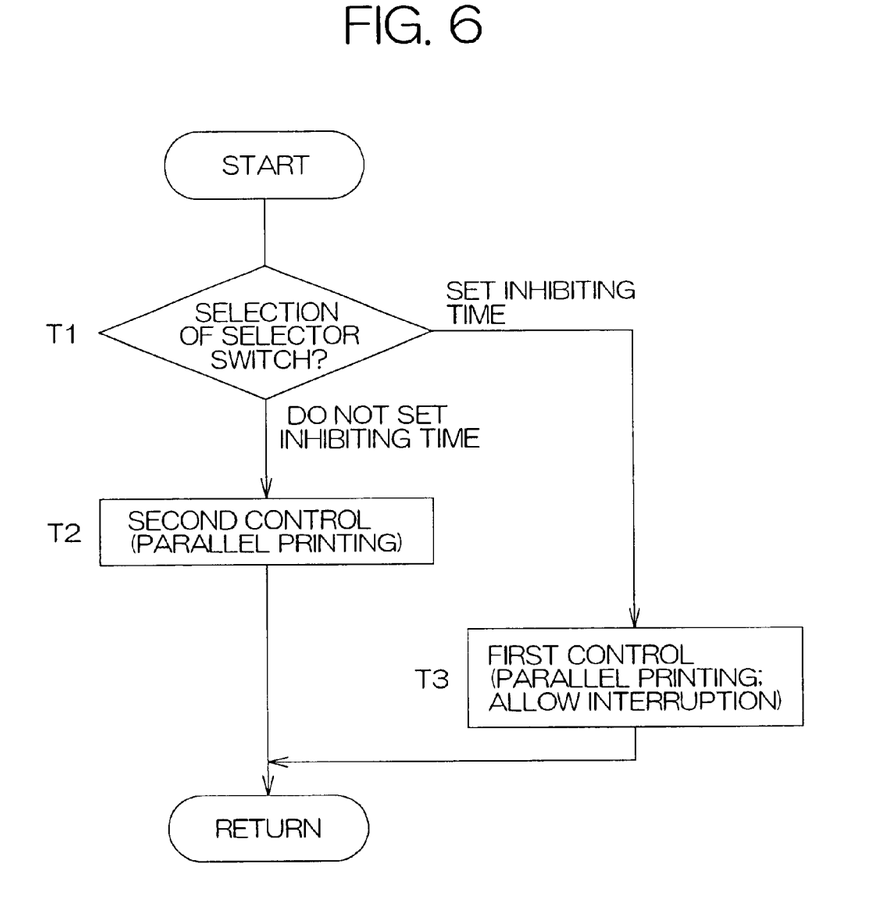
FIG. 6 is a flowchart detailing a procedure when changing a content of the control by a selector switch according to one embodiment of the present invention.

FIG. 6 is a flowchart detailing manual switching processing between the first control and the second control.

In case that it is determined not to set the parallel printing inhibiting time period in Step T1, the input processing and the print processing in a period between t23 and t27 of FIG. 2 are performed (Step T2). Otherwise (when the parallel printing inhibiting time period is set), the parallel printing inhibiting time period like in a period between t34 and t35 of FIG. 1 is set (Step T3).

As a result, under the circumstances where the users frequently use interruption processing, by inputting corresponding settings into the input/manipulation/display section 8, interruption processing, such as copying, becomes available to the users during the parallel printing inhibiting time period (corresponding to a period between t34 and t35 of FIG. 1), and any other user does not have to wait long even when a great number of jobs are inputted in succession.

On the other hand, under the circumstances where the users seldom use the interruption processing, by inputting corresponding settings into the input/manipulation/display section 8, the parallel print processing is performed without accepting any interruption processing (corresponding to a period between t24 and t27 of FIG. 2). Hence, it never happens that originally a whole set of print data is divided and printed out with a time interval in between.

What is claimed is:

1. A printing apparatus comprising:
    a memory for storing paged data;
    an input processing section for successively inputting one or more than one set of paged data included in a job, which is defined as a print unit, into the memory;
    a printing section for successively performing print processing of the paged data stored in the memory; and
    a control section for controlling an operation of each of the input processing section and the printing section,
    wherein the control section effects a first control, according to which, in case that print processing of a preceding job to a particular job has not ended yet when the control section is to start input processing of the particular job, the control section waits until the print processing of the preceding job ends and sets a print-inhibiting time for inhibiting parallel print processing to handle interruption processing in a period between an end of the print processing of the preceding job and a start of the input processing of the particular job, then waits until the print-inhibiting time ends and starts the input processing of the particular job, and then starts print processing of the particular job without waiting until the input processing of the particular job ends.

2. A printing apparatus comprising:

a memory for storing paged data;

an input processing section for successively inputting one or more than one set of paged data included in a job, which is defined as a print unit, into the memory;

a printing section for successively performing print processing of the paged data stored in the memory; and a control section for controlling an operation of each of the input processing section and the printing section, wherein the control section effects a second control, according to which, in case that print processing of a preceding job to a particular job has not ended yet when the control section is to start input processing of the particular job, the control section waits until the print processing of the preceding job ends and starts the input processing of the particular job, and then starts print processing of the particular job without waiting until the input processing of the particular job ends.

3. The printing apparatus according to claim 1, wherein, in case that print processing of a preceding job to a particular job has not ended yet when the control section is to start input processing of the particular job, the control section judges whether the particular job and the preceding job are divided jobs of a whole set of job data or undivided independent jobs, whereby the control section switches a control based on a judgment result as follows:

upon judging as being undivided independent jobs, the control section effects a first control; and upon judging as being divided jobs of a whole set of job data, the control section effects a second control, according to which the control section waits until the print processing of the preceding job ends and starts the input processing of the particular job, and then starts print processing of the particular job without waiting until the input processing of the particular job ends.

4. The printing apparatus according to claim 1, wherein, in case that print processing of a preceding job to a particular job has not ended yet when the control section is to start input processing of the particular job, the control section judges whether the particular job and the preceding job are divided jobs of a whole set of job data or undivided independent jobs, whereby the control section switches a control based on a judgment result as follows:

upon judging as being undivided independent jobs, the control section effects the first control; and upon judging as being divided jobs of a whole set of job data, the control section effects a third control, according to which the control section waits until input processing of the preceding job ends and starts the input processing of the particular job continuously, and then starts print processing of the particular job without waiting until the input processing of the particular job ends.

5. A computer-readable control program of a printing apparatus for allowing the printing apparatus to perform:

input processing for successively inputting paged data included in a job defined as a print unit;

print processing for successively printing out input paged data; and a first control, according to which, in case that print processing of a preceding job to a particular job has not ended yet when the control program is to start input processing of the particular job, the control program waits until the print processing of the preceding job ends and sets a print-inhibiting time for inhibiting parallel print processing to handle interruption processing in a period between an end of the print processing of the preceding job and a start of the input processing of the particular job, then waits until the print-inhibiting time ends and starts the input processing of the particular job, then starts print processing of the particular job without waiting until the input processing of the particular job ends.

6. A computer-readable control program of a printing apparatus for allowing the printing apparatus to perform:

input processing for successively inputting paged data included in a job defined as a print unit;

print processing for successively printing out input paged data; and a second control, according to which, in case that print processing of a preceding job to a particular job has not ended yet when the control program is to start input processing of the particular job, the control program waits until the print processing of the preceding job ends and starts the input processing of the particular job, and then starts print processing of the particular job without waiting until the input processing of the particular job ends.

7. A printing apparatus comprising:

a memory for storing paged data;

an input processing section for successively inputting one or more than one set of paged data included in a job, which is defined as a print unit, into the memory;

a printing section for successively performing print processing of the paged data stored in the memory; and a control section for controlling an operation of each of the input processing section and the printing section, wherein, in case that print processing of a preceding job to a particular job has not ended yet when the control section is to start input processing of the particular job, the control section judges whether the particular job and the preceding job are divided jobs of a whole set of job data or undivided independent jobs, whereby the control section switches a control based on a judgment result as follows:

upon judging as being undivided independent jobs, the control section effects a first control; and upon judging as being divided jobs of a whole set of job data, the control section effects a second control, in the first control, in case that print processing of a preceding job to a particular job has not ended yet when the control section is to start input processing of the particular job, the control section waits until the print processing of the preceding job ends and sets a print-inhibiting time for inhibiting parallel print processing to handle interruption processing in a period between an end of the print processing of the preceding job and a start of the input processing of the particular job, then waits until the print-inhibiting time ends and starts the input processing of the particular job, and then starts print processing of the particular job without waiting until the input processing of the particular job ends, in the second control, the control section waits until the print processing of the preceding job ends and starts the input processing of the particular job, an then starts print processing of the particular job without waiting until the input processing of the particular job ends.

8. A computer-readable control program of a printing apparatus for allowing the printing apparatus to perform:

input processing for successively inputting paged data included in a job defined as a print unit;

print processing for successively printing out input paged data; and wherein, in case that print processing of a preceding job to a particular job has not ended yet when the control section is to start input processing of the particular job, the control section judges whether the particular job and the preceding job are divided jobs of a whole set of job data or undivided independent jobs, whereby the control section switches a control based on a judgment result as follows:

upon judging as being undivided independent jobs, the control section effects a first control; and upon judging as being divided jobs of a whole set of job data, the control section effects a third control, in the first control, in case that print processing of a preceding job to a particular job has not ended yet when the control section is to start input processing of the particular job, the control section waits until the print processing of the preceding job ends and sets a print-inhibiting time for inhibiting parallel print processing to handle interruption processing in a period between an end of the print processing of the preceding job and a start of the input processing of the particular job, then waits until the print-inhibiting time ends and starts the input processing of the particular job, and then starts print processing of the particular job without waiting until the input processing of the particular job ends, in the third control section waits until input processing of the preceding job ends and starts the input processing of the particular job continuously, and then starts print processing of the particular job without waiting until the input processing of the particular job ends.

* * * * *